United States Patent
Fukawa

(10) Patent No.: US 6,243,412 B1
(45) Date of Patent: Jun. 5, 2001

(54) ADAPTIVE ARRAY TRANSMITTER RECEIVER

(75) Inventor: Kazuhiko Fukawa, Yokohama (JP)

(73) Assignee: NTT Mobile Communications Network Inc., Tokyo (JP)

( * ) Notice: Subject to any disclaimer, the term of this patent is extended or adjusted under 35 U.S.C. 154(b) by 0 days.

(21) Appl. No.: 09/125,883

(22) PCT Filed: Jun. 2, 1998

(86) PCT No.: PCT/JP98/02421

§ 371 Date: Aug. 27, 1998

§ 102(e) Date: Aug. 27, 1998

(87) PCT Pub. No.: WO98/56121

PCT Pub. Date: Dec. 10, 1998

(30) Foreign Application Priority Data

Jun. 3, 1997 (JP) .................................................. 9-145343

(51) Int. Cl.[7] .................................................. H04B 15/00
(52) U.S. Cl. ........................... 375/219; 375/285; 375/232
(58) Field of Search ................................. 455/129, 33.3, 455/276.1, 368, 378, 383, 384; 375/233, 322, 331, 283, 280, 279, 330, 102

(56) References Cited

U.S. PATENT DOCUMENTS

| | | | |
|---|---|---|---|
| 4,661,816 | * 4/1987 | Musha et al. | 342/91 |
| 5,142,551 | * 8/1992 | Borth et al. | 375/232 |
| 5,274,844 | 12/1993 | Harrison et al. . | |
| 5,689,528 | 11/1997 | Tsujimoto . | |
| 5,752,173 | 5/1998 | Tsujimoto . | |
| 5,909,466 | * 6/1999 | Labat et al. | 375/233 |

FOREIGN PATENT DOCUMENTS

| | | |
|---|---|---|
| 43 14 739 | 11/1993 | (DE) . |
| 0 604 956 | 7/1994 | (EP) . |
| 0 687 076 | 12/1995 | (EP) . |
| 2691842 | 12/1993 | (FR) . |
| 2266998 | 11/1993 | (GB) . |
| 3-35622 | 2/1991 | (JP) . |
| 6-53727 | 2/1994 | (JP) . |
| 6-204902 | 7/1994 | (JP) . |
| 7-95655 | 4/1995 | (JP) . |
| 7-235896 | 9/1995 | (JP) . |
| 7-336129 | 12/1995 | (JP) . |

* cited by examiner

Primary Examiner—Chi Pham
Assistant Examiner—Mohammed Lachhab
(74) Attorney, Agent, or Firm—Connolly Bove Lodge & Hutz

(57) ABSTRACT

Received baseband signals from a plurality of antennas $11_1$ to $11_Q$ are linearly combined through multiplication by weighting coefficients, then a decision signal is delayed for one symbol duration, and the delayed signal is multiplied by a feedback filter coefficient $w_b^*$ to generate intersymbol interference, which is subtracted from the linearly combined output y(i). The subtracted output is subjected to a signal decision to obtain a decision signal, then the difference between the input into a decision unit 17 and the decision signal is obtained as an error signal e(i), and weighting coefficients $w_1^*$ to $w_Q^*$ and the feedback filter coefficient $w_b^*$ are estimated in a parameter estimation part 71 so that the square of the error signal e(i) is minimized. At the transmitting side a transmitted signal is delayed for 1T and is then multiplied by the feedback filter coefficient $w_b^*$, then intersymbol interference is subtracted from the transmitted signal to distort it, and the distorted signal is multiplied by the weighting coefficients $w_1^*$ to $w_Q^*$, respectively, thereby creating transmitted baseband signals for application to the antennas $11_1$ to $11_Q$.

15 Claims, 12 Drawing Sheets

ADAPTIVE ARRAY TRANSMITTER RECEIVER

TECHNICAL FIELD

The present invention relates to an adaptive array transmitter-receiver that suppresses degradation of the transmission performance due to interference signals and intersymbol interference in digital radio communications and, more particularly, to an adaptive array transmitter-receiver in a TDD system which uses the same carrier frequency in both uplink and downlink channels.

PRIOR ART

In digital mobile communications, the spatial reuse of the same frequency is adopted for the purpose of efficient utilization of frequency and one of significant challenges thereto is countermeasures against cochannel interference. An adaptive array, which is a kind of interference canceller, is one of promising techniques therefor; referring first to FIG. 1, its operation will be described, by way of example, in connection with reception by a base station under the uplink channel. With the adaptive array, it is possible to suppress interference signals through adaptive control of the directivity 10 of the array antenna 11 in its entirety by combining received signals from its plural antennas while controlling their phases and amplitudes. In the example of FIG. 1, in the case of receiving transmitted signals from a mobile station M1, a base station BS decreases the antenna gain of the array antenna 11 in the directions of interfering mobile stations M2 and M3 to suppress received signals therefrom, i.e. interference signals, while at the same time increasing the antenna gain in the direction of the mobile station M1 to receive the desired signal at a sufficiently high level.

FIG. 2 depicts the frame structure in the TDD (Time Division Duplex) system. In the TDD system, as shown in FIG. 2-Row A, for example, the mobile stations M1, M2 and M3 time-share carriers of the same frequency, besides each mobile station uses the same carrier frequency over its uplink UL and downlink DL. Accordingly, as shown in FIG. 2-Row B, for example, the mobile station M1 sends a signal in burst form to the base station over the uplink UL of a given time slot and receives a signal in burst form from the base station over the downlink DL. Each burst signal is composed of a training signal TR and a data signal DATA following it, and the uplink burst signal and the downlink burst signal are adjacent but separated by a guard time $T_G$ from each other. Hence, uplink and downlink channel impulse responses could be regarded as substantially the same unless they undergo sharp variations during the uplink and downlink burst. The guard time $T_G$ is determined taking into account a relatively long transmission delay of the channel.

In such a system that employs the same carrier frequency for the uplink and the downlink as in the TDD system, since adjoining uplink and downlink burst signals can be regarded as propagating over substantially the same channel, the uplink and downlink channel impulse responses can also be considered the same. Accordingly, if the pattern of a receiving antenna gain obtained over the uplink is used as a transmitting antenna pattern over the downlink, it is possible to reduce interference with reception at the mobile station in the downlink. This will be described with reference to FIG. 1; if the receiving antenna gain 10 is used as the transmitting antenna pattern, no radio waves are sent toward the mobile stations M2 and M3 but radio waves are sent in the direction of the mobile station M1, so that interference at the mobile stations M2 and M3 can be suppressed.

An adaptive array transmitter-receiver utilizing this transmission system is described, for example, in Shigeru TOMISATO and Tadashi MATSUMOTO, "Performances of Adaptive Transmission Array in TDD Mobile Communication Systems," B-5-87, 1997 IEICE General Conference; its configuration is shown in FIG. 3 with some parts supplemented. Incidentally, it is assumed in FIG. 3 that the sampling period $T_S$ of a receiver baseband signal is equal to the modulation symbol duration T.

Having passed through duplexers $12_1$ to $12_Q$ from Q (where Q is an integer equal to or greater than 2) transmitting-receiving antennas forming the array antenna 11, received signals are converted, by baseband signal generators $13_1$ to $13_Q$ respectively corresponding thereto, to baseband signals, which are fed as received baseband signals to output terminals $14_1$ to $14_Q$. The received baseband signals each have an in-phase and a quadrature component, and the baseband signal generators $13_1$ to $13_Q$ shown in FIG. 3 constitute a receiving part 13. All the baseband signals will hereinafter be given in complex notation with the in-phase and quadrature components denoted as the real and imaginary parts, respectively. The received baseband signals $x_1(i)$ to $x_Q(i)$ corresponding to the high-frequency signals from the transmitting-receiving antennas $11_1$ to $11_Q$ are multiplied by weighting coefficients $w_1^*$ to $w_Q^*$ in complex multipliers $15_1$ to $15_Q$, respectively, and the multiplier outputs are added together by a complex adder 16, from which the resulting combined signal y(i) is output. By adaptive control of the weighting coefficients $w_1^*$ to $w_Q^*$, the directivity of the receiving antenna gain of the array antenna 11 can be controlled, and consequently, the combined signal y(i) can be generated so that interference signals are suppressed. The complex multipliers $15_1$ to $15_Q$ and the complex adder 16 make up a linear combination part 20. A decision unit 17 makes a hard decision on the combined signal y(i) and outputs a decision signal via an output terminal 18.

Assume that a known training signal is used for initial convergence of parameter estimation and that the received signal is sent in burst form with the training signal followed by the data signal as referred to previously with reference to FIG. 2. A switching circuit 19 outputs the training signal from a training signal memory 21 during the training signal period, and during the following data signal period outputs the decision signal. A complex subtractor 22 outputs, as an error signal e(i), the difference between the output from the switching circuit 19 and the combined signal from the complex adder 16. The decision unit 17, the switching circuit 19, the training signal memory 21 and the complex subtractor 22 make up a signal decision part 24. A parameter estimation part 23 inputs thereinto the received baseband signals $x_1(i)$ to $x_Q(i)$ and the error signal e(i), and estimates the weighting coefficients $w_1^*$ to $w_Q^*$ through the use of a least mean squares algorithm so that a mean-squared value of the error signal e(i) is minimized.

On the other hand, a transmitted signal is input via an input terminal 25 and a hybrid 26 into complex multipliers $27_1$ to $27_Q$. The complex multipliers $27_1$ to $27_Q$ multiply the transmitted signal by the abovementioned weighting coefficients $w_1^*$ to $w_Q^*$, respectively. This is equivalent to an operation of matching the transmitting antenna pattern with the receiving antenna pattern. The hybrid 26 and the complex multipliers $27_1$ to $27_Q$ constitute a transmitted baseband generation part 30. Q output signals from the complex multipliers $27_1$ to $27_Q$ are converted by RF modulated wave generators $28_1$ to $28_Q$ into RF frequency band signals, which are fed via the duplexers $12_1$ to $12_Q$ to the transmitting-receiving antennas $11_1$ to $11_Q$ respectively corresponding thereto, from which they are transmitted. The RF modulated wave generators $28_1$ to $28_Q$ make up a transmitting part 28.

The received baseband signal generators $13_1$ to $13_Q$ and the RF modulated wave generators $28_1$ to $28_Q$ perform down-conversion and up-conversion of frequency using a carrier signal which is generated by a carrier signal generator 29. In FIG. 4 there is depicted the configuration of the received baseband signal generator $13_q$ (q=1, ..., Q). The received signal input via an input terminal 31q is amplified by a low-noise amplifier 32 and then branched by a hybrid 33. One of the branched signals is multiplied, in a multiplier 35, by a carrier signal fed thereto via an input terminal 34, then the multiplied signal is input into a low-pass filter 36, and then it is converted by an A/D converter 37 into a digital signal by being sampled every sampling period $T_S$. The other signal from the hybrid 33 is multiplied, in a multiplier 39, by a carrier signal that is shifted 90 degrees in phase by a phase shifter 38, and the multiplied signal is input into a low-pass filter 41, thereafter being sampled by an A/D converter 42 for conversion into a digital signal. This manipulation is a quasi-coherent detection, and the outputs from the A/D converters 37 and 42 correspond to the in-phase and quadrature components of the quasi-coherent detected signal; the two outputs are combined into a received baseband signal $x_q$, which is fed via an output terminal $14_q$ to the multiplier $15_q$ in FIG. 3.

FIG. 5 shows the configuration of the RF modulated wave generator $28_q$ (q=1, ..., Q). A transmitted baseband signal $v_q$ is input thereinto via an input terminal $44_q$. The in-phase component of the transmitted baseband signal $v_q$ is multiplied, in a multiplier 45, by a carrier signal fed thereto via an input terminal 34. On the other hand, the quadrature component is multiplied, in a multiplier 47, by the carrier signal shifted 90 degrees in phase by a phase shifter 46. The outputs from the multipliers 45 and 47 are combined by an adder 48, and the combined signal is amplified by a transmitting amplifier 49, from which it is fed via an output terminal $51_q$ to the duplexer $12_q$ and thence to the antenna $11_q$ in FIG. 3.

In the adaptive array transmitter-receiver depicted in FIG. 3, intersymbol interference cannot be ignored when the delay time of a delayed signal component becomes longer 0.2 times or more the modulation symbol duration T. In the case of receiving such delayed signals, that is, in frequency selective fading environments, the delayed signal components from the desired station are removed as interference signal components, and hence they run to waste—this means that radio waves from the desired station are not effectively received. In addition, letting the number of antennas being represented by Q and if the number of interference signals including delayed signal components of the desired signal is more than Q, only up to Q−1 interference signals can be removed; therefore, radio waves from other interfering stations cannot be removed by the number of delayed signal components that are removed, resulting in the reception/transmission performance being degraded accordingly. Furthermore, the mobile station that receives radio waves transmitted from the adaptive array transmitter-receiver is required to be additionally equipped with the function of an equalizer in the radio receiver so as to suppress degradation of the reception/transmission performance due to intersymbol interference caused by the delayed signal components; in this instance, the hardware scale of the receiver of the mobile station becomes enormous.

As described above, in the frequency selective fading environments the conventional adaptive array transmitter-receiver can neither effectively receive radio waves from a desired station nor sufficiently remove interfering signals emanating from other stations, and hence it is subject to degradation of the reception/transmission performance; besides, the function of an equalizer is needed in the receiver of each mobile station which receives transmitted signals—this makes hardware implementation of the receiver difficult.

An object of the present invention is to provide an adaptive array transmitter-receiver which keeps the reception/transmission performance from degradation even in the frequency selective fading environments and avoids the need for the function of an equalizer in receivers of mobile stations.

DISCLOSURE OF THE INVENTION

An adaptive array transmitter-receiver according to the present invention, which utilizes the TDD system, comprises:

receiving means for converting received signals from Q (where Q is an integer equal to or greater than 2)transmitting-receiving antennas into baseband signals, and for outputting the received baseband signals;

linear combination means for weighting each of said received baseband signals by weighting coefficients, and for combining the resulting weighted received baseband signals to generate a combined signal;

feedback filter means for convoluting a feedback complex symbol signal and feedback filter coefficients, and for outputting the result of convolution as a feedback signal;

signal decision means supplied with said combined signal and said feedback signal, for making a signal decision and outputting a decision signal, and for outputting an error signal resulting from the signal decision, said feedback complex symbol signal and a complex symbol signal for parameter estimation;

parameter estimating means supplied with said received baseband signals, said complex symbol signal for parameter estimation and said error signal, for estimating said weighting coefficients and said feedback filter coefficients so that a mean-square value square of said error signal becomes minimum, and for outputting the estimated coefficients;

transmitter distortion means for convoluting said feedback filter coefficients and a delayed transmitted distortion signal to obtain an estimated channel distortion, for subtracting said estimated channel distortion from a transmitted signal, and for generating the result of subtraction as said transmitted distortion signal;

transmitted baseband generating means for weighting said transmitted distortion signal by said weighting coefficients to generate Q transmitted baseband signals; and transmitting means for converting said transmitted baseband signals into RF frequency signals, and for transmitting them via said transmitting-receiving antennas corresponding thereto, respectively.

The said signal decision means may be decision feedback means that makes a hard decision of said combined signal, or maximum likelihood sequence estimation means that makes a signal decision by maximum likelihood sequence estimation using, as an error signal, the difference between said combined signal and a replica signal.

BEST MODE FOR CARRYING OUT THE INVENTION

Embodiment 1

Figure 6:
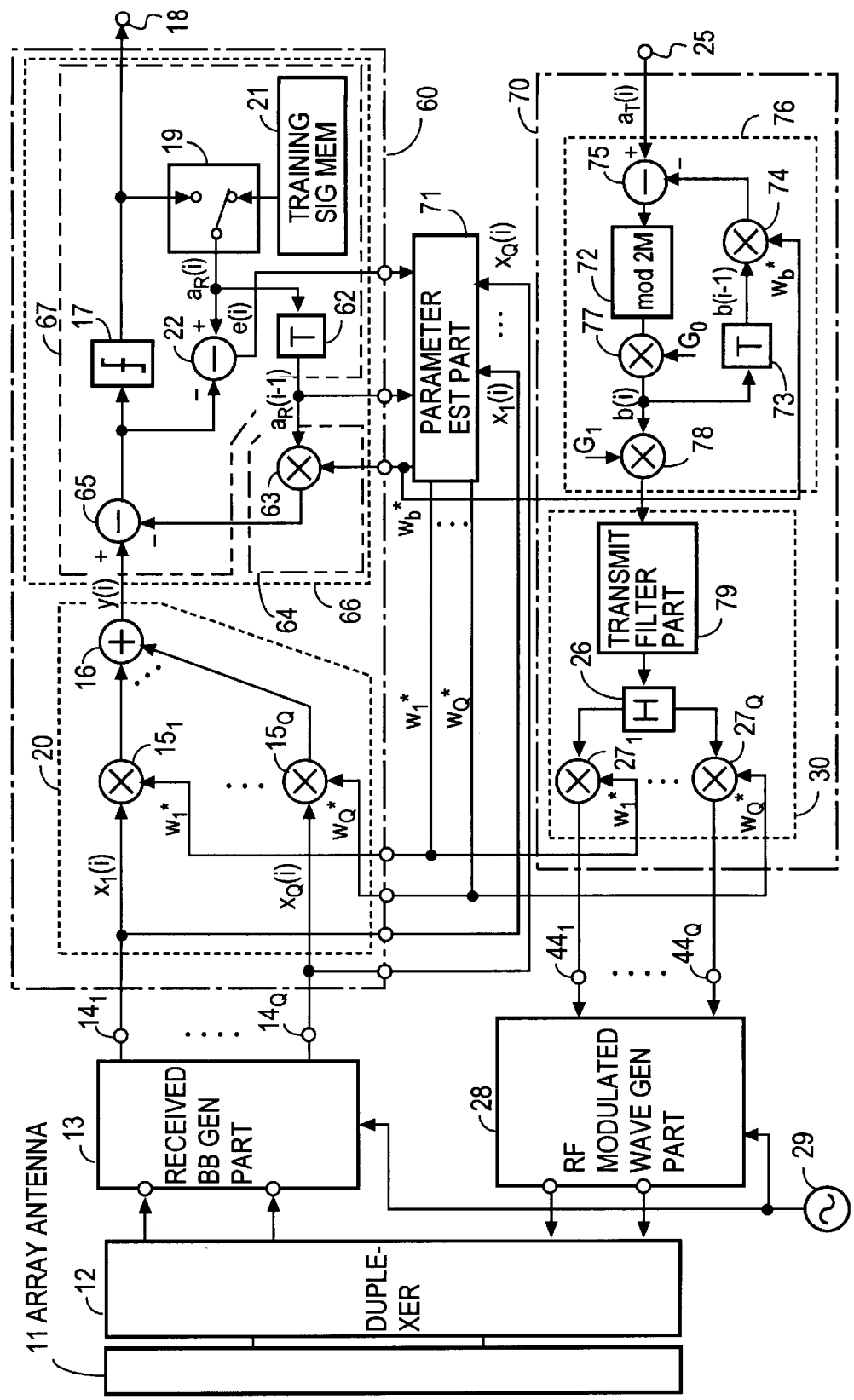
FIG. 6 is a block diagram illustrating the functional structure of Embodiment 1 of the present invention.

In FIG. 6 there is shown the configuration of Embodiment 1 of the present invention. The array antenna 11, the duplexer 12, the received baseband signal generating part 13 and the RF modulated wave generating part 28 are identical in construction with those in FIG. 3, and hence they are shown in block form in FIG. 6. Assume here that the sampling period $T_S$ is equal to the symbol duration T and that the maximum delay time of a delayed signal component of the desired signal is 1T. The received baseband signals $x_1(i)$ to $x_Q(i)$ are input via the terminals $14_1$ to $14_Q$. The received baseband signals $x_1(i)$ to $x_Q(i)$, which correspond to the received high-frequency signals from the transmitting-receiving antennas $11_1$ to $11_Q$, are multiplied by the weighting coefficients $w_1*$ to $w_Q*$ in the complex multipliers $15_1$ to $15_Q$, respectively, and they are combined by the complex adder 16 into the combined signal y(i). By adaptive control of the weighting coefficients $w_1*$ to $w_Q*$, the directivity of the receiving antenna gain can be controlled, and hence the combined signal y(i) can be generated so that interfering signals are suppressed. The complex multipliers $15_1$ to $15_Q$ and the complex adder 16 make up the linear combination part 20.

In this embodiment, for the purpose of initial convergence of the parameter estimation, the switching circuit 19 passes therethrough a known training signal from the training signal memory 21 to the subtractor 22 during the training signal period, thereby obtaining the error signal e(i) which is the difference between the training signal and the combined signal. Based on this error signal, a parameter estimation part 71 estimates the channel impulse response (corresponding to a feedback filter coefficient $w_b*$) and the weighting coefficients $w_1*$ to $w_Q*$ as described later on. During the data signal period following the training signal, the switching circuit 19 passes therethrough a decision signal from the decision unit 17 to the subtractor 22 for comparison with the combined signal, and based on the error e(i) between the two signals, the parameter estimation circuit 71 adaptively updates the feedback filter coefficient $w_b*$ and the weighting coefficients $w_1*$ to $w_Q*$.

In this embodiment, a complex symbol signal $a_R(i)$, which is the output from the switching circuit 19, is delayed by a delay element 62 for the time 1T and then convoluted (multiplied) by the feedback filter coefficient $w_b*$ in a complex multiplier 63, from which a feedback signal is provided. The feedback signal is an estimation of intersymbol interference caused by delayed signal components, and the complex multiplier 63 constitutes a feedback filter part 64. To remove intersymbol interference, a complex subtractor 65 subtracts the feedback signal from the combined signal y(i) to generate an intersymbol interference removed signal and applies it to the decision unit 17. The decision unit 17 makes a hard decision of this signal and outputs a decision signal via the output terminal 18. The complex subtractor 22 outputs, as the error signal e(i), the difference between the intersymbol interference removed signal and the output $a_R(i)$ from the switching circuit 19 which is the decision signal, and provides the error signal to the parameter estimation part 71. The delay element 62, the complex subtractors 22 and 65, the decision unit 17, the switching circuit 19 and the training signal memory 21 make up a signal decision part 67, and the signal decision part 67 and the feedback filter part 64 constitute a decision feedback equalizer 66. The linear combination part 20 and the equalizer 66 in combination will hereinafter be referred to as an adaptive array equalizing/receiving part 60.

The parameter estimation part 71 inputs thereinto the received baseband signals $x_1(i)$ to $x_Q(i)$, the delayed element output $a_R(i-1)$ which is a delayed version of the decision signal, and the error signal e(i), and estimates the weighting coefficients $w_1*$ to $w_Q*$ and the feedback filter coefficient $w_b*$ through the use of the least squares algorithm so that the mean-square value of the error signal e(i) is minimized.

Figure 1:
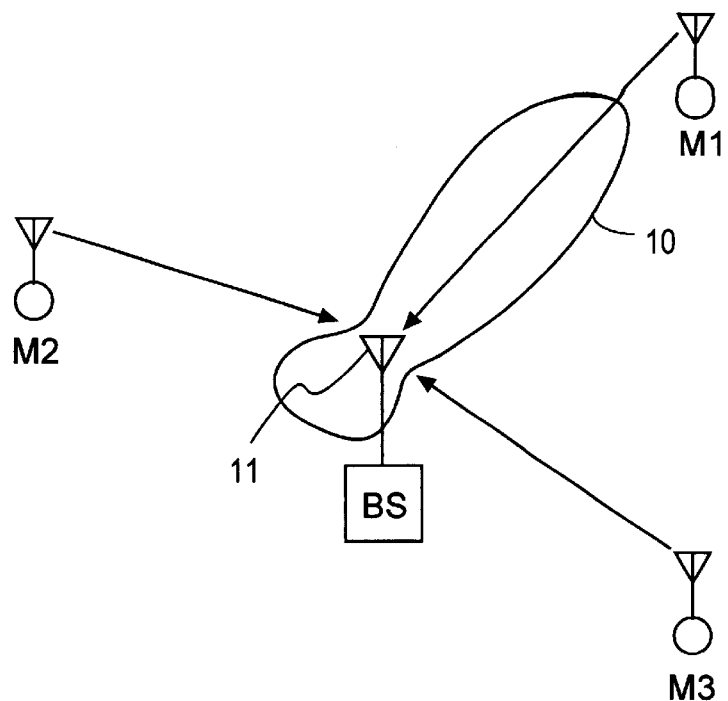
FIG. 1 is a diagram depicting the directional pattern of a conventional adaptive array antenna in a base station and an example of the relationship between the base station's and mobile stations, positions.
Figure 2:
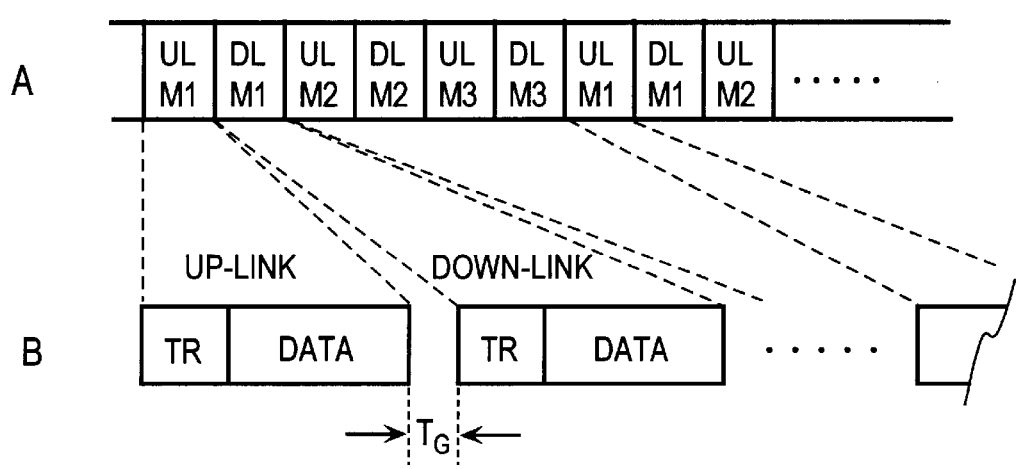
FIG. 2 is a diagram depicting the frame structure of a burst signal in the TDD system.
Figure 3:
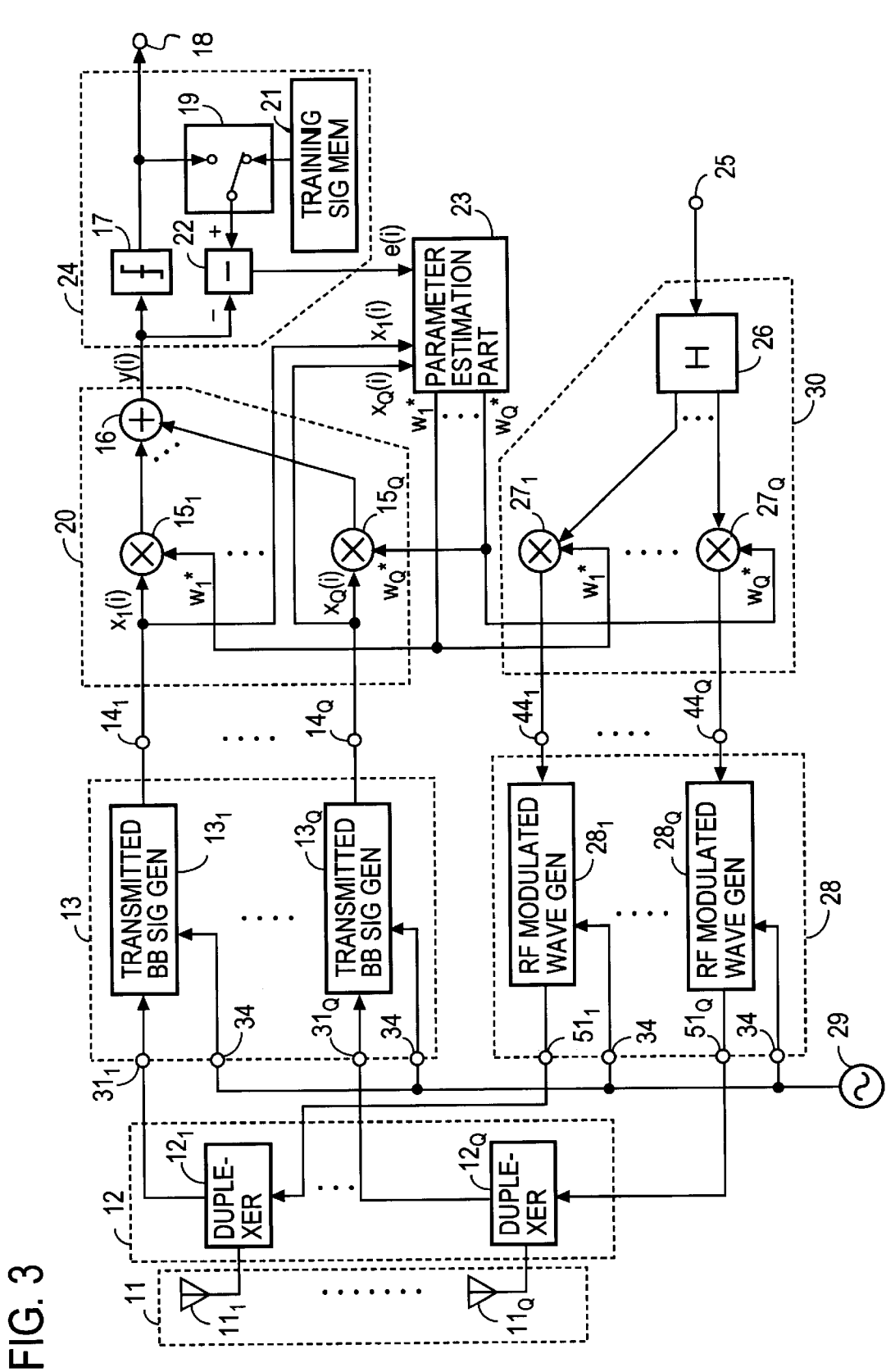
FIG. 3 is a block diagram illustrating the functional structure of a conventional adaptive array transmitter-receiver.
Figure 4:
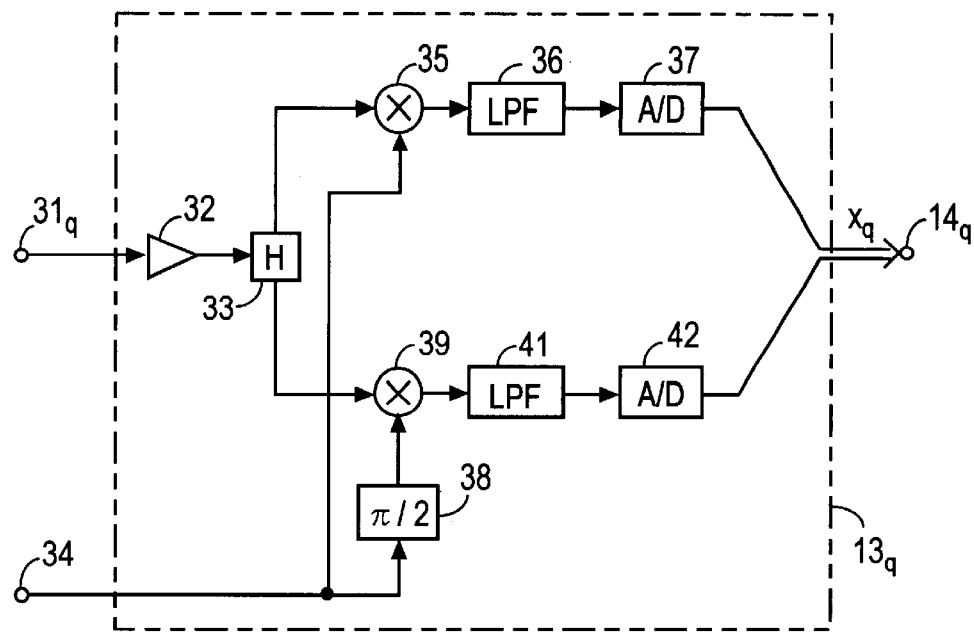
FIG. 4 is a block diagram illustrating the functional structure of a received baseband signal generator 13 in FIG. 3.
Figure 5:
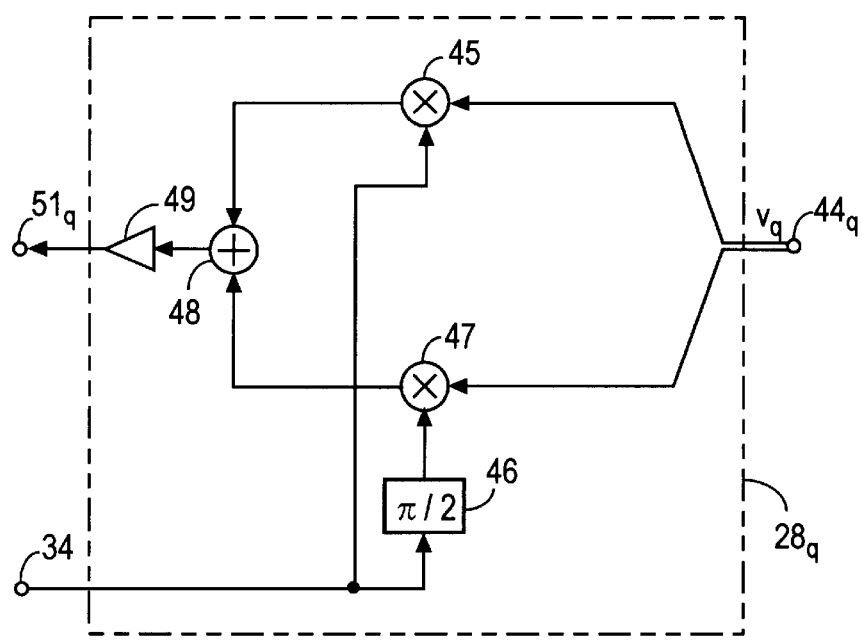
FIG. 5 is a block diagram illustrating the functional structure of an RF modulated wave generator 28 in FIG. 3.

Since the intersymbol interference due to delayed signal components is removed in the signal decision part 67, no delayed signal components of the desired signal are removed in the linear combination part 20. In the linear combination part 20, letting the number of antennas be represented by Q, the number of interference signals that can be removed is limited only to Q−1; radio waves from other interfering stations can be removed corresponding to the number of delayed signal components of the desired signal that need not to be removed. In contrast to this, the prior art example of FIG. 3 is not designed to remove intersymbol interference from the combined signal in the signal decision part 24, and the delayed signal components from the desired station are regarded as interfering signal components because of the use of the adaptive algorithm in the parameter estimation part 23, and they are removed by the control of the weighting coefficients $w_1^*$ to $w_Q^*$ for the linear combination part 20; hence, the number of interference signals from other interfering stations that can be removed decreases correspondingly. Thus, this embodiment permits effective removal of radio waves from other interfering stations as compared with the prior art example, and hence it improves the reception/transmission performance accordingly.

Next, a description will be given of the transmitting part in FIG. 6. Since the uplink and the downlink shares the same carrier frequency in the TDD system as described, the uplink and downlink channels can be regarded as substantially the same. Hence, at the transmitting side the feedback filter coefficient $w_b^*$, computed at the receiving side when it received the last symbol of the uplink signal, is fed intact to a complex multiplier 74 to generate a channel distortion due to intersymbol interference that is anticipated, and the channel distortion is pre-subtracted by a subtractor 75 from the baseband signal $a_T(i)$ to be transmitted, that is, pre-coding of the transmitter signal takes place. Further, the weighting coefficients $w_1^*$ to $w_Q^*$, calculated simultaneously with the coefficient $w_b^*$, are fed intact to the transmitted baseband generation part 30, whereby the same antenna pattern as the receiving antenna pattern of the array antenna 11 is set at the time of transmission. That is, a transmitter distortion signal b(i) is delayed by a delay element 73 for the period 1T and then multiplied by the feedback filter coefficient $w_b^*$ in a complex multiplier 74. The multiplication result is subtracted by a complex subtractor 75 from the transmitted complex symbol signal $a_T(i)$ input thereinto through the input terminal 25. Letting the numbers of signal points on the I and Q axes of the transmitted complex symbol signal $a_T(i)$ be represented by M, a modulo operation part 72 performs a modulo-2M operation of the subtraction result $\{a_T(i)-w_b^*b(i-1)\}$. That is, by performing the operation of the following expression $$=\{a_T(i)-w_b^*b(i-1)\} \bmod 2M \tag{1}$$

if the real or imaginary part of the result of subtraction by the complex subtractor 75 is outside a range of from −M to +M, an integral multiple of 2M is subtracted from or added to the real or imaginary part, by which it can be shifted into the −M to +M range. In the case of QPSK modulation, M=2. This processing is intended to prevent the feedback loop from dispersion depending on the channel condition owing to the feedback of the transmission distortion signal b(i) to the complex subtractor 75 via the delay element 73 and the complex multiplier 74. Incidentally, the receiver in the mobile station is required to take this modulo operation into account when it makes the signal decision. The prevention of dispersion due to the feedback loop by such modulo operation is disclosed, for example, in Harashima et al, "Matched-Transmission Technique for Channels with Intersymbol Interference," IEEE Tans. Comm., vol. COM-20, pp. 774–780, August 1972, but this literature is silent about the application of the modulo operation to the adaptive array as proposed by the present invention.

Now, the signal obtained by Eq. (1) will be newly called the transmitter distortion signal b(i). The complex subtractor 75, a modulo operation unit 72, the delay element 73 and the complex multiplier 74 make up a transmitter distortion part 76. Multipliers 77 and 78 will be described later on, which are assumed here to multiply a gain G0=G1=1 (that is, they may be omitted in this embodiment). Such pre-coding of the transmission signal is intended to generate a received signal free from intersymbol interference due to delayed signal components at the receiving end which receives the transmission signal; to this end, a distorted component corresponding to intersymbol interference to which the transmission signal $a_T(i)$ will be subject during transmission is subtracted therefrom in advance to thereby cancel the distortion at the receiving end.

The transmitted distortion signal b(i), which is the output signal from the transmitted distortion part 76, is fed into a transmitting filter part 79, wherein it is limited to a predetermined band, thereafter being input into the complex multipliers $27_1$ to $27_Q$ via the hybrid 26. In the complex multipliers $27_1$ to $27_Q$, the band-limited transmitter distortion signal b(i) is multiplied by the abovementioned weighting coefficients $w_1^*$ to $w_Q^*$, respectively. This is an operation equivalent to making the transmitting antenna pattern match up with the receiving antenna pattern. The Q output signals of the complex multipliers $27_1$ to $27_Q$ are supplied as transmitter baseband signals to the array antenna 11 through the output terminals $44_1$ to $44_Q$, the RF modulated wave generating part 28 and the duplexer 12. The transmitting filter part 79, the hybrid 26 and the complex multipliers $27_1$ to $27_Q$ constitute the transmitted baseband generating part 30, and the transmitted distortion part 76 and the transmitted baseband generating part 30 constitute a transmission array pre-coding part 70.

It has already been described that the transmission of the transmitted distortion signal b(i) protects the received signal from intersymbol interference at the receiving end. This will be described below mathematically. To begin with, the combined signal y(i), which is the output signal of the linear combination part 20, is expressed by the following equation using the output $a_R(i)$ of the switching circuit 19, the feedback filter coefficient $w_b^*$ and the error signal e(i):

$$y(i)=a_R(i)+w_b^*a_R(i-1)+e(i) \tag{2}$$

Eq. (2), if expressed in terms of z-transformation by setting the z-transformation of y(i) as $Y(z^{-1})$, the z-transformation of $a_R(i)$ as $A_R(z^{-1})$ and the z-transformation of e(i) as $E(z^{-1})$, is given as follows:

$$Y(z^{-1})=(1+w_b^*z^{-1})A_R(z^{-1})+E(z^{-1}) \tag{3}$$

Accordingly, letting the z-transformation of the channel impulse response be represented by $H(z^{-1})$, it is given as follows:

$$H(z^{-1})=(1+w_b^*z^{-1}) \tag{4}$$

Next, the transmitted distortion signal b(i), if expressed using the transmission signal $a_T(i)$ and the feedback filter coefficient $w_b^*$, is given as follows:

$$b(i)=a_T(i)-w_b^*b(i-1)+2Mc(i) \tag{5}$$

where c(i) is a discrete complex number which makes each of the imaginary and the real part an integer. Eq. (5), if expressed in terms of z-transformation by setting the z-transformation of b(i) as $B(z^{-1})$, the z-transformation of $a_T(i)$ as $A_T(z^{-1})$ and the z-transformation of c(i) as $C(z^{-1})$, is given as follows:

$$(1+w_b^*z^{-1})B(z^{-1})=A_T(z^{-1})+2MC(z^{-1}) \tag{6}$$

Using Eq. (4), Eq. (6) becomes as follows:

$$H(z^{-1})B(z^{-1})=A_T(z^{-1})+2MC(z^{-1}) \tag{7}$$

In the above, $H(z^{-1})B(z^{-1})$ is the received signal at the receiving end, and that it is equal to the sum of the z-transformation $A(z^{-1})$ of $a_T(i)$ and the z-transformation $2MC(z^{-1})$ of $2Mc(i)$ means that the received signal, though added with the discrete complex number, is free from the intersymbol interference due to the delayed signal components.

Since the received signal is not subject to the intersymbol interference resulting from delayed signal components even in the frequency selective fading environments as described above, the equalizer function is not needed in the receiver of the mobile station and its hardware implementation becomes simple.

Embodiment 2

Figure 7:
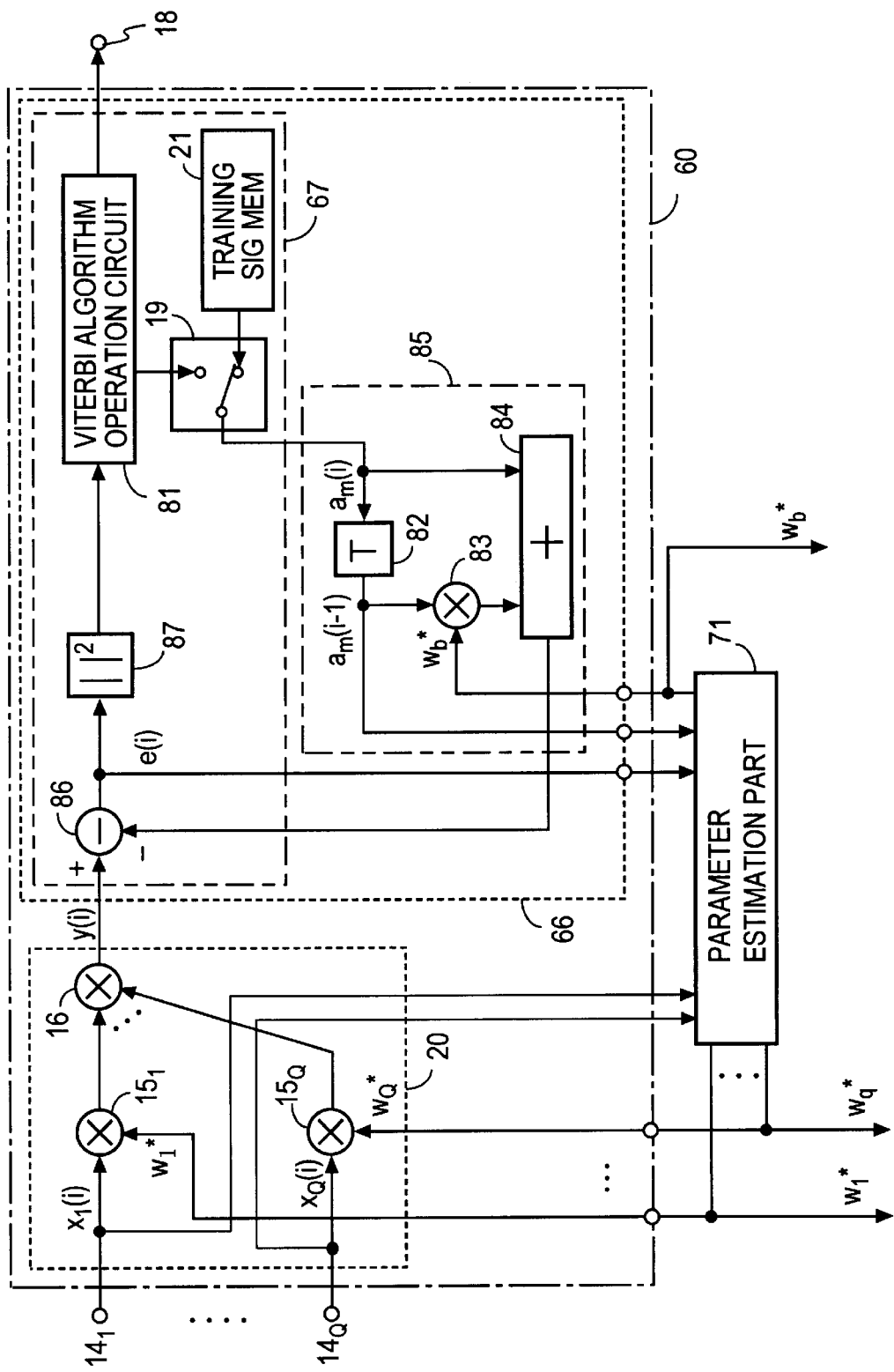
FIG. 7 is a block diagram illustrating the functional structure of an adaptive array equalizing/receiving part in Embodiment 2 of the present invention.

The equalizer 66 of the adaptive array equalization/reception part 60 in the FIG. 6 embodiment does not effectively use the power of the delayed signal components of the desired signal because the intersymbol interference due to the delayed signal components is removed from the combined signal in the signal decision part 67. In FIG. 7 there is depicted an embodiment of the signal decision part 67 of the adaptive array equalization/reception part 60 that makes effective use of the power. This embodiment utilizes the maximum likelihood sequence estimation in the signal decision part 67 of the equalizer 66. Incidentally, the array antenna 11, the duplexer 12, the received baseband signal generating part 13, the RF modulated wave generating part 28 and the transmission array pre-coding part 70 in this embodiment are the same as those used in the FIG. 6 embodiment, and hence they are not shown. Let it be assumed that the sampling period $T_S$ is equal to the symbol duration T and that the maximum delay time of the delayed signal components of the desired signal is 1T.

The received baseband signals $x_1(i)$ to $x_Q(i)$ input via the terminals $14_1$ to $14_Q$ are multiplied by the weighting coefficients $w_1^*$ to $w_Q^*$ in the complex multipliers $15_1$ to $15_Q$, respectively, and the multiplier outputs are added together by the complex adder 16 into the combined signal y(i). Adaptive control of the weighting coefficients $w_1^*$ to $w_Q^*$ allows control of the directivity of the receiving antenna gain, making it possible to generate the combined signal y(i) of the desired signal components with interfering signal components suppressed.

The signal decision part 67 is made up of a complex subtractor 86, a squaring circuit 87, a Viterbi algorithm operation circuit 81, the switching circuit 19 and the training signal memory 21. In this embodiment, too, the switching circuit 19 selects the training signal read out of the memory 21 during the training signal period of the received signal and, during the data signal period, selects a candidate symbol signal for the received signal from the Viterbi algorithm operation circuit 81, the selected signal being fed into a feedback filter part 85. The complex symbol candidate $a_m(i)$ output from the Viterbi algorithm operation circuit 81 is fed via the switching circuit 19 to the feedback filter part 85, wherein it is delayed by a delay element 82 for the time 1T, while at the same time it is fed to a complex adder 84. The complex symbol candidate $a_m(i-1)$ delayed by the delay element is fed to the parameter estimation part 71, while at the same time it is fed to a complex multiplier 83 and is convoluted (in this example, multiplied) by the feedback filter coefficient $w_b^*$ from the parameter estimation part 71. The multiplier output is applied to the complex adder 84, wherein it is added to the non-delayed complex symbol candidate $a_m(i)$, and the adder output is fed as a feedback signal to the complex subtractor 86. The delay element 82, the complex multiplier 83 and the complex adder 84 constitute the feedback filter part 85, which corresponds to the feedback filter part 64 in the embodiment of FIG. 6. The feedback signal, which is output from the complex adder 84, is a replica signal that is an estimated version of the received signal subjected to a channel delay and a channel distortion.

The complex subtractor 86 outputs, as the error signal e(i), the difference between the combined signal y(i) and the replica signal. The squaring circuit 87 multiplies the square of an absolute value of the error signal e(i) by a negative constant and outputs the multiplied value as likelihood information, i.e. as a branch metric. The Viterbi algorithm operation circuit 81 outputs the aforementioned complex symbol candidate, and makes the signal decision by the maximum likelihood sequence estimation through the use of the Viterbi algorithm. In concrete terms, the Viterbi algorithm operation circuit calculates a log likelihood function, i.e. a path metric, as an accumulated value of branch metrics for each complex symbol sequence candidate, and computes by the Viterbi algorithm a complex symbol sequence candidate that maximizes the path metric. Furthermore, the Viterbi algorithm operation circuit outputs to the output terminal 18, as a decision signal, that complex symbol of the selected complex symbol sequence candidate with the decision delay. The parameter estimation part 71 is supplied with the received baseband signals $x_1$ to $x_Q$, the delayed complex symbol $a_m(i-1)$ and the error signal e(i), and determines the feedback filter coefficient $w_b^*$ and the weighting coefficients $w_1^*$ to $w_Q^*$ by the least squares algorithm so that the power of the error signal e(i) is minimized. The signal decision part 67 and the feedback filter part 85 form the equalizer 66 employing the maximum likelihood sequence estimation.

Figure 8:
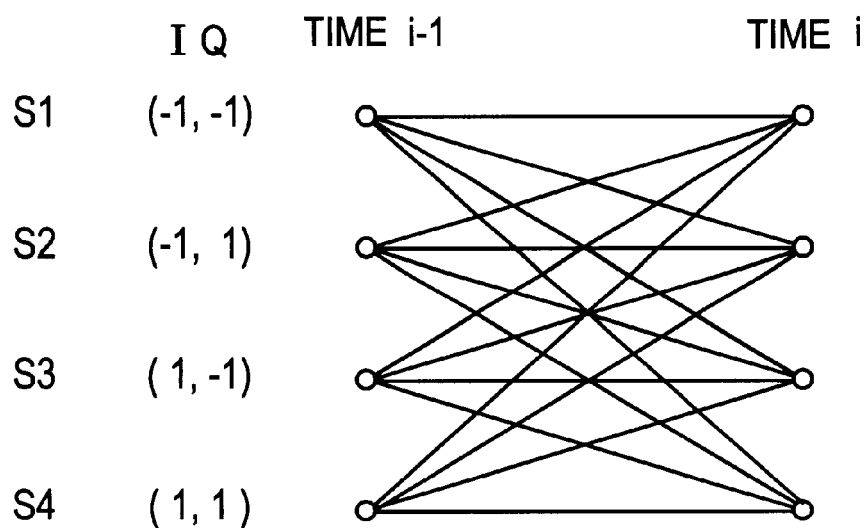
FIG. 8 is a trellis diagram based on a Viterbi algorithm in FIG. 7.

For example, in the case where the QPSK modulation system is used and the channel is two path propagation with the time delay being 1T period, if the Viterbi algorithm is used for the maximum likelihood sequence estimation, the trellis diagram in this case is such as shown in FIG. 8. For every path having survived at each time i, that is, for each of states S1, S2, S3 and S4, the complex symbol $a_m(i)$ corresponding to the state is output as a complex symbol candidate, and the parameter estimation is made in the parameter estimation part 71. Accordingly, the parameter estimation needs to be made corresponding to the number of states (four in FIG. 8) at each time—this increases the computational complexity but ensures sufficient tracking of channel variations. The weighting coefficients $w_1^*$ to $w_Q^*$ that are set in the transmitted baseband signal generating part 30 and the feedback filter coefficient $w_b^*$ that is set in the transmitted distortion part 76 have the values corresponding to the maximum likelihood sequence at the final symbol of the received burst signal.

Although in the FIG. 7 embodiment the delayed complex symbol signal $a_m(i-1)$ is multiplied by the feedback filter coefficient $w_b^*$, the non-delayed symbol signal $a_m(i)$ may also be multiplied by the feedback filter coefficient $w_b^*$. In such an instance, $(w_b^*)^{-1}$ is provided as each of the weighting coefficient of the complex multiplier 74 and the gain G1 of the complex multiplier 78 in the transmitted distortion part 76 (see FIG. 6) at the transmitting side. Since the complex multiplier 78 merely serves as an amplifier, however, gain $G_1=1$ may be provided thereto in place of $G_1=(w_b^*)^{-1}$ (that is, the multiplier 78 may be omitted). This modified form is identical in construction with the FIG. 7 embodiment except the above.

Figure 10:
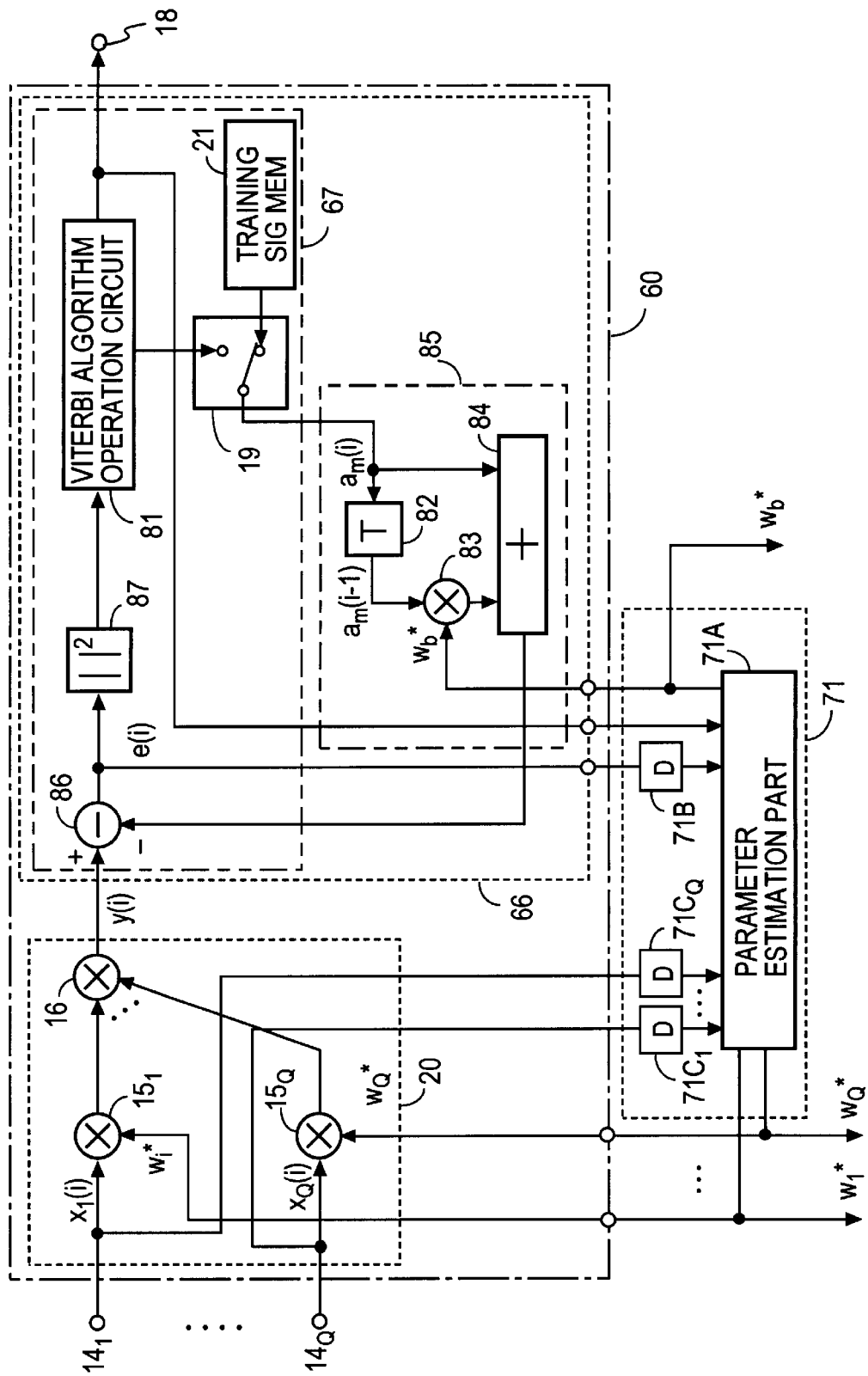
FIG. 10 is a block diagram depicting the functional structure of another modified form of the FIG. 7 embodiment.

The embodiment of FIG. 7 may be modified such that the decision output of the Viterbi algorithm operation circuit 81, in place of the delayed symbol signal $a_m(i-1)$, is fed to the parameter estimation part 71 as depicted in FIG. 10. The Viterbi algorithm involves a decision delay, and the decision signal is delayed behind the current one for the period corresponding to the decision delay, but this does not matter if channel variations are negligible during the decision delay; since there is no need for making the parameter estimation corresponding to the number of states at each time i, the computational complexity can be reduced. In this situation, the parameter estimation part 71 feeds the received baseband signals $x_1(i), \ldots, x_Q(i)$ and the error signal e(i) to a parameter estimation circuit 71A after delaying them by delay circuits 71C$_1$ to 71C$_Q$ and 71B for the time of delay caused by the signal decision as shown in FIG. 10.

Figure 11:
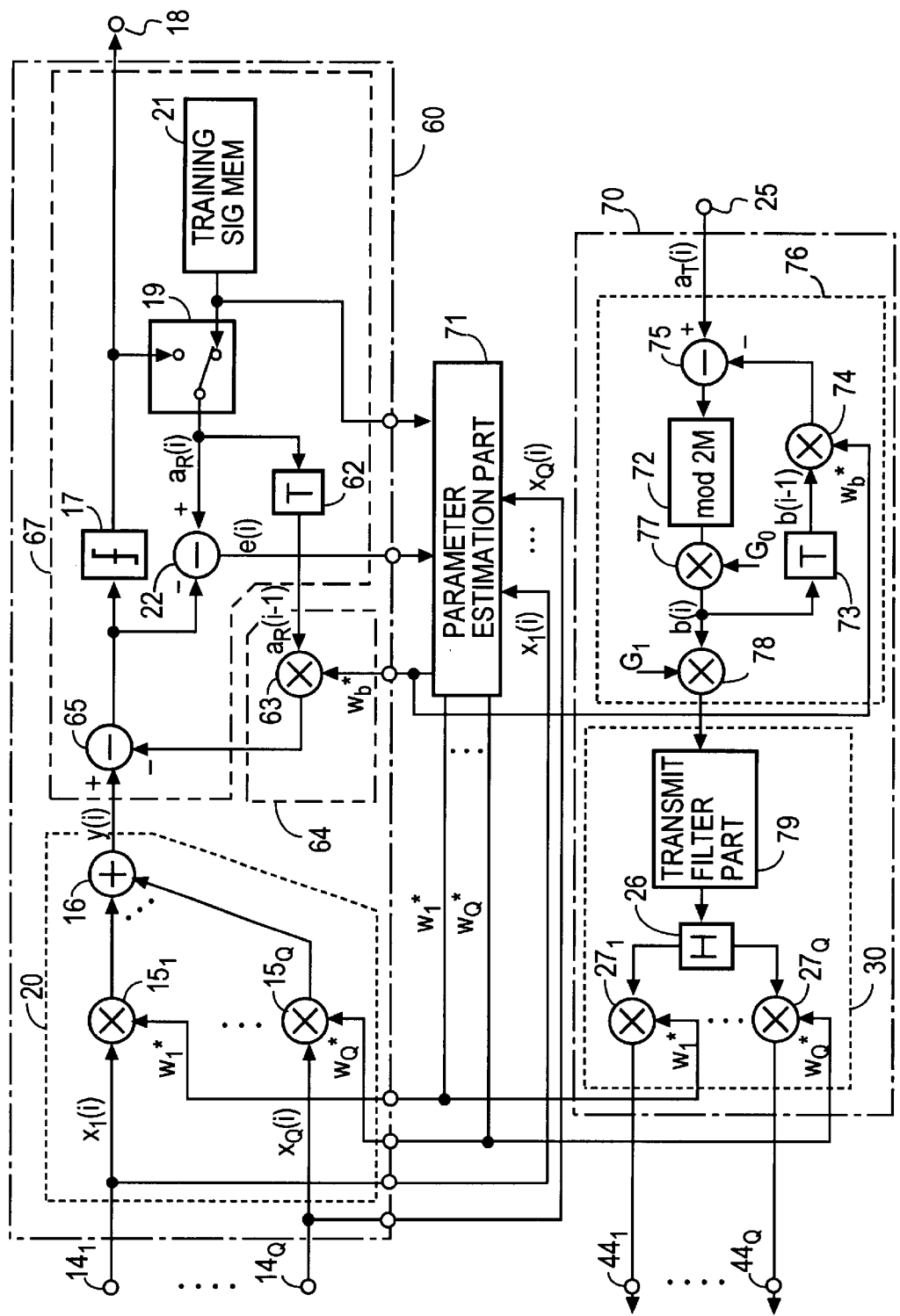
FIG. 11 is a block diagram depicting the functional structure of a modified form of the FIG. 6 embodiment.

FIG. 11 illustrates a modified form of the FIG. 6 embodiment, in which the parameters $w_b^*$ and $w_1^*$ to $w_Q^*$ estimated during the training signal period are used intact without modification during the data signal period. In this case, training signals are sequentially applied, as a complex symbol sequence $a_R(i), a_R(i+1), \ldots$ to the parameter estimation part 71, then the weighting coefficients $w_1^*$ to $w_Q^*$ and the feedback filter coefficient $w_b^*$ are sequentially determined by the least squares method from the error signal e(i), the training symbol signal $a_R(i)$ and the received baseband signals $x_1$ to $x_Q$, and the weighting coefficients $w_1^*$ and $w_Q^*$ and the feedback filter coefficient $w_b^*$ thus determined at the last symbol signal of the training signal are used intact without modification during the data signal period.

Figure 12:
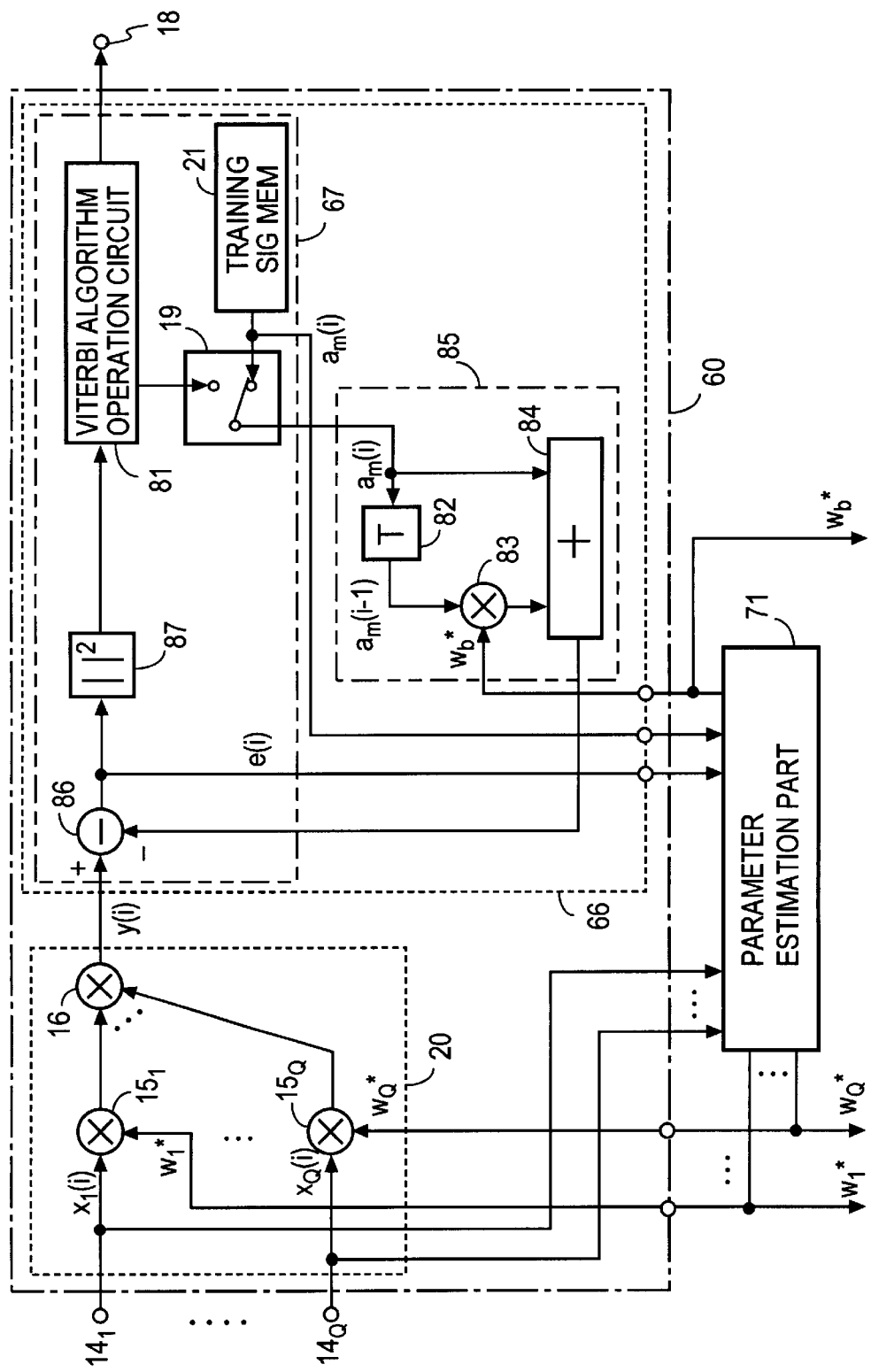
FIG. 12 is a block diagram depicting the functional structure of still another modified form of the FIG. 7 embodiment.

FIG. 12 illustrates a modified form of the FIG. 7 embodiment, in which the parameters $w_b^*$ and $w_1^*$ to $w_Q^*$ estimated during the training signal period are used intact without modification during the data signal period as is the case with the FIG. 11 embodiment. In this instance, too, the parameter estimation during the training signal period is performed by applying the complex symbol signal $a_m(i)$ from the training signal memory 21 directly to the parameter estimation part 71 and then sequentially estimating the parameters $w_1^*$ to $w_Q^*$ and $w_b^*$ by using the training symbol signal, the received baseband signals $x_1$ to $x_Q$ and the error signal e(i) from the complex subtractor 86 through the use of the least squares method. The parameters estimated at the last complex symbol signal of the training signal are not updated during the data signal period but are used intact.

In the embodiments of FIGS. 7, 9, 10 and 12, since intersymbol interference due to delayed signal components is not removed, the equalizer 66, unlike in the FIG. 6 embodiment, makes effective use of the power of delayed signal components of the desired signal, and hence it enhances reception/transmission performance as compared with the equalizer 66 in the embodiments of FIGS. 6 and 11.

Figure 13:
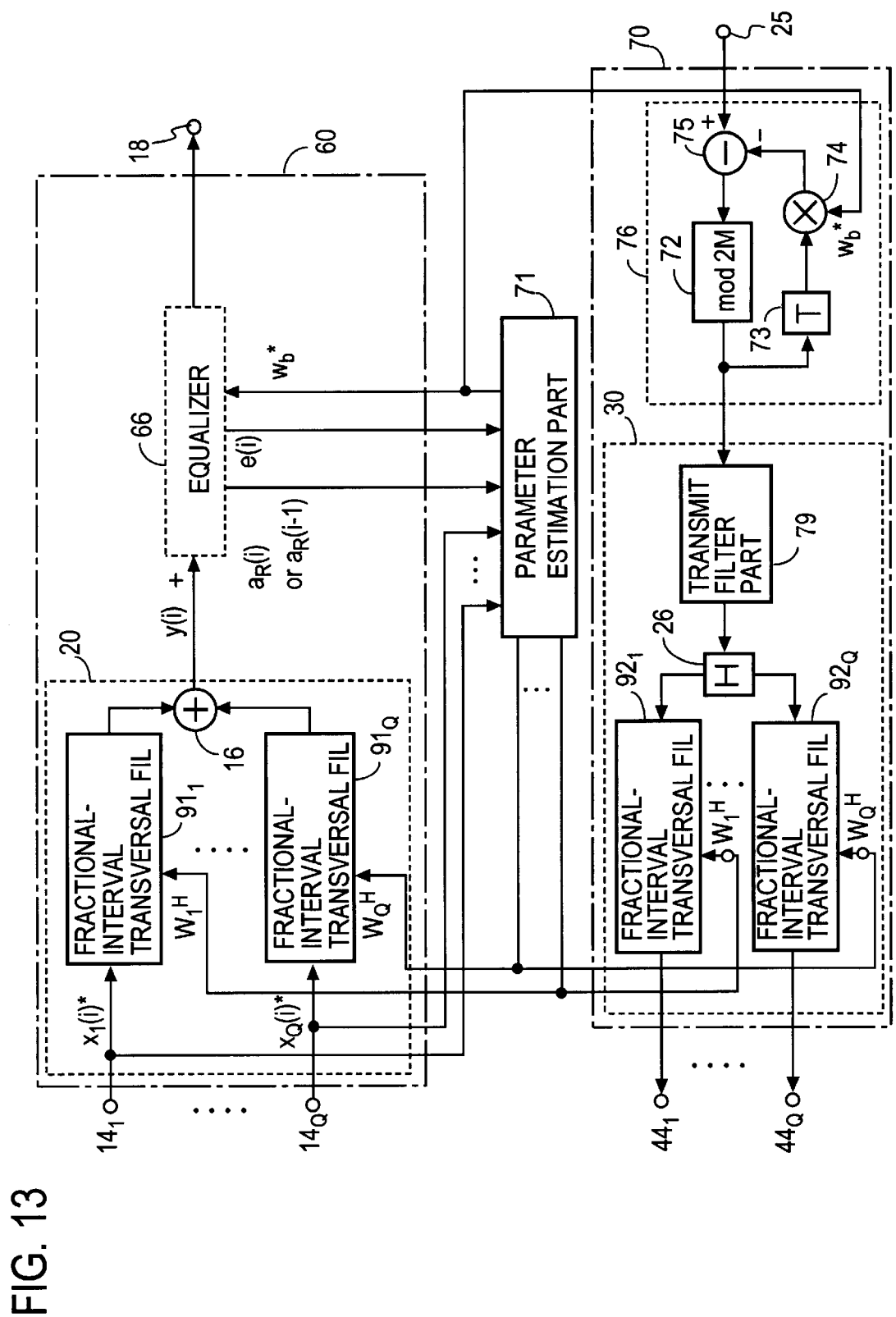
FIG. 13 is a functional block diagram illustrating an embodiment that employs transversal filters as multipliers.

While the embodiments have each been described to employ the complex multipliers 15$_1$ to 15$_Q$ in the linear combination part 20 and the complex multipliers 27$_1$ to 27$_Q$ in the transmitted baseband signal generating part 30 for the purpose of multiplication by the weighting coefficients $w_1^*$ to $w_Q^*$, these multipliers may be replaced with transversal filters, to which weighting coefficients $w_1^H$ to $w_Q^H$ are fed as filter coefficients. FIG. 13 illustrates such a modification. In FIG. 13, the equalizer 66 may be of the type that the signal decision part 67 makes either the hard decision as depicted in FIGS. 6 and 11 or the maximum likelihood sequence estimation as depicted in FIGS. 7, 9, 10 and 12. The parameter estimation part 71 estimates the feedback filter coefficient $w_b^*$ and the filter coefficients $w_1^H$ to $w_Q^H$ by using the received baseband signals $x_1$ to $x_Q$, the error signal e(i) and the received symbol signal $a_R(i)$ or $a_R(i-1)$. These filter coefficients are respectively convoluted by the received baseband signals $x_1(i)$ to $x_Q(i)$ in transversal filters 91$_1$ to 91$_Q$ of the linear combination part 20 and then convoluted again by the transmitted distortion signal b(i) in transversal filters 92$_1$ to 92$_Q$ of the transmitted baseband generating part 30.

Figure 14:
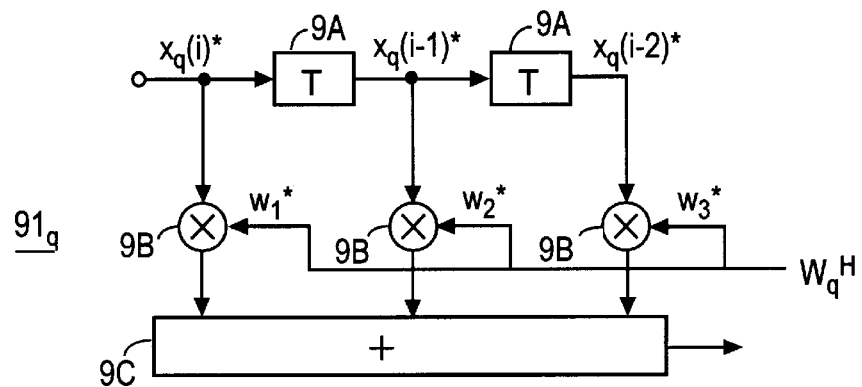
FIG. 14 is a block diagram depicting an example of the configuration of the transversal filter in FIG. 13.

The embodiment of FIG. 13 shows the case where the sampling period $T_S$ is equal to the symbol duration T. In this instance, for example, as depicted in FIG. 14, each transversal filter 91$_q$ (q=1, . . . , Q) comprises plural series-connected stages of delay elements 9A of a delay time equal to the symbol duration T; the input signal $x_q(i)$ to the series-connection of the delay elements and outputs $x_q(i-1)$, $x_q(i-2)$, . . . of the respective delay stages are multiplied by weighting coefficients (filter coefficients) $w_1^*$, $w_2^*$ and $W_3^*$ in multipliers 9B, respectively, and the multiplier outputs are added together by an adder 9C. That is, the input signal $x_q(i)$ is convoluted by a filter coefficient vector $W_q^H$. The transversal filters 92$_1$ to 92$_Q$ of the transmitted baseband generating part 30 are also identical in construction with the abovementioned.

Figure 15:
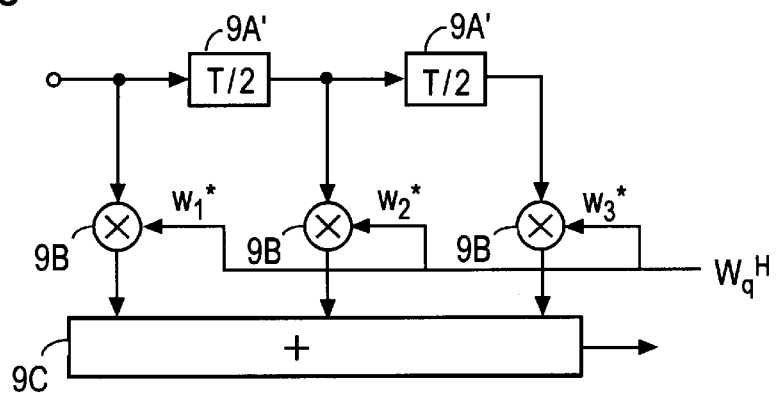
FIG. 15 is a block diagram showing an example of a fractional-interval transversal filter.

It is known, in general, that a timing offset of the sampling clock causes significant degradation of the average BER performance when the sampling period $T_S$ is equal to the symbol duration T. To avoid this, it is effective to perform what is called fractional-interval sampling of a period shorter than the symbol duration T, for example, T/2. Such a fractional-interval sampling period can be realized, in the FIG. 13 embodiment, by replacing the delay elements 9A of the transversal filters 91$_q$ and 92$_q$ (q=1, . . . , Q) of the linear combination part 20 and the transmitted baseband generating part 30, shown in FIG. 14, with delay elements 9A' the delay time of which is ½ the sampling duration T as depicted in FIG. 15. In the case of applying this configuration to all of the transversal filters 91$_1$ to 91$_Q$ and 92$_1$ to 92$_Q$ in FIG. 13, the output signal of the transmitted distortion part 76 is provided every symbol duration T, and hence it is required to be converted by the transmitting filter part 79 into a signal with the sampling period $T_S$ before it is input into the transversal filters 92$_1$ to 92$_Q$. The transmitting filter part 79 may be formed by using a well-known cosine roll-off filter or root roll-off filter.

Figure 16A:
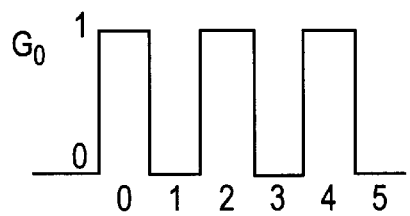
FIG. 16A is a waveform diagram showing a gain control signal which is applied to a complex multiplier 77 during a training signal period.
Figure 16B:
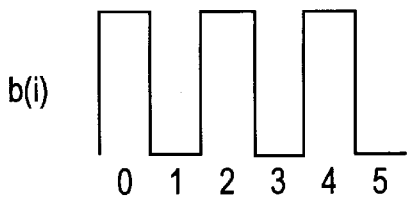
FIG. 16B is a waveform diagram showing a transmitter distortion signal rendered into pulse form by the gain control signal of FIG. 16A.

As described previously in respect of FIG. 6 embodiment, there is provided the modulo operation part 72 in the transmitted distortion part 76 of the transmitting array pre-coding part 70 of the base station to prevent divergence of the feedback loop. On the other hand, the mobile station establishes synchronization with the received signal in the training signal duration of the burst signal sent from the base station and receives the succeeding data signal, but when an integral of 2M is subtracted from or added to the input signal $\{a_T(i)-w_b^*(i-1)\}$ by the modulo operation part 72 in the base station, difficulty arises in establishing carrier synchronization when the mobile station receives the signal sent from the base station. In particular, when no carrier synchronization is established during the training signal duration, the mobile station cannot correctly receive the transmission signal from the base station. As a solution to this problem, a gain control signal $G_0$ whose amplification ratio repeatedly varies between 1 and 0 as depicted in FIG. 16A is applied to the complex multiplier 77 in FIG. 6 during the training signal period, by which the transmitted distortion signal b(i) is rendered into pulse form as shown in FIG. 16B, thereby to prevent a signal of a large absolute value from feedback. This gain control is performed only during the training signal period, and during the data signal period the gain control signal $G_0$ is set at 1. The gain control during the training signal period can be applied to any of the embodiments described previously.

Figure 9:
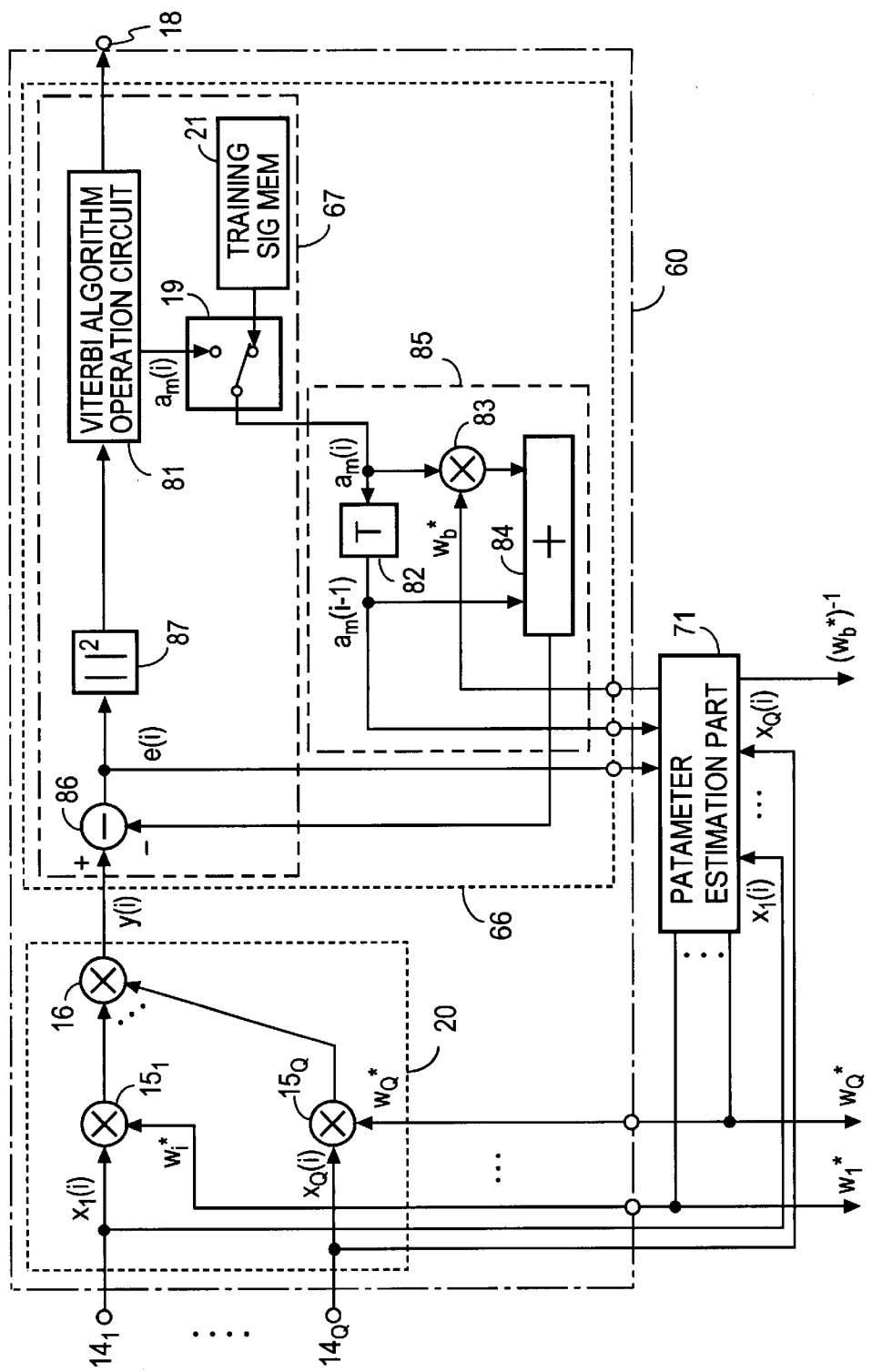
FIG. 9 is a block diagram depicting the functional structure of a modified form of the FIG. 7 embodiment.

While in each of the above embodiments the maximum delay time of the delayed signal components of the desired signal has been described to be 1T, it is easy to implement an extension to a system in which the maximum delay time is NT (where N is an integer equal to or greater than 2)—this can be done by replacing each of the complex multiplier 63 of the feedback filter part 64 and the complex multiplier 74 in FIGS. 6 and 11 and the complex multiplier 83 of the feedback filter part 85 in FIGS. 7, 9, 12 and 13 with an N-tap, symbol-interval type transversal filter and using its tap coefficient as the feedback filter coefficient. In the embodiment of FIG. 9, however, it is necessary that the delay time of the delay element 82 be set at NT.

EFFECT OF THE INTENTION

As described above, the present invention prevents degradation of the reception/transmission performance even in frequency selective fading environments and suppresses intersymbol interference due to delayed signal components by filtering the transmission signal, and hence the invention offers an adaptive array transmitter-receiver which is free from the necessity of providing the function of an equalizer in the receiver of the mobile station.

The present invention is of great utility when employed in a high-speed transmission radio system wherein cochannel interference is not negligible.

What is claimed is:

1. An adaptive array transmitter-receiver in the time division duplex system, comprising:

receiving means for converting received signals from Q combination transmitting-receiving antennas into baseband signals, and for outputting the received baseband signals, said Q being an integer equal to or greater than 2;

linear combination means for weighting each of said received baseband signals by a weighting coefficient, and for combining the resulting weighted received baseband signals to generate a combined signal;

feedback filter means for convoluting a feedback complex symbol signal and a feedback filter coefficient, and for outputting the result of convolution as a feedback signal;

signal decision means supplied with said combined signal and said feedback signal, for making a signal decision and outputting a decision signal, and for outputting an error signal resulting from the signal decision, said feedback complex symbol signal and a complex symbol signal for parameter estimation;

parameter estimating means supplied with said received baseband signals, said complex symbol signal for parameter estimation and said error signal, for estimating said weighting coefficients and said feedback filter coefficient so that a mean-square value of said error signal becomes minimum, and for outputting the estimated coefficients;

transmitted distortion means for convoluting said feedback filter coefficient and a delayed transmitted distortion signal to obtain an estimated channel distortion, for subtracting said estimated channel distortion from a transmitted signal, and for generating the result of subtraction as said transmitted distortion signal;

transmitted baseband generating means for weighting delayed said transmitted distortion signal by said weighting coefficients to generate transmitted baseband signals; and transmitting means for converting said transmitted baseband signals into RF frequency signals, and for transmitting them via said transmitting-receiving antennas corresponding thereto, respectively.

2. The adaptive array transmitter-receiver of claim 1, further comprising transmitter filter means for limiting said transmitted distortion signal to a predetermined band, and for applying the resulting band-limited transmitted distortion signal to said transmitted baseband generating means.

3. The adaptive array transmitter-receiver of claim 1, further comprising modulo operation means for performing a modulo operation of said transmitted distortion signal so that its power falls within the predetermined range.

4. The adaptive array transmitter-receiver of claim 1, 2, or 3, wherein said signal decision means comprises: first subtractor means for subtracting said feedback signal from said combined signal to generate an intersymbol-interference removed signal; a decision unit for making a hard decision of said intersymbol-interference removed signal and for outputting said decision signal; a delay element for delaying said decision signal, and for outputting the delayed signal as said feedback complex symbol signal and said complex symbol signal for parameter estimation; and second subtractor means for outputting, as said error signal, the difference between said intersymbol-interference removed signal and said decision signal.

5. The adaptive array transmitter-receiver of claim 1, 2, or 3, wherein said signal decision means comprises: subtractor means for subtracting said feedback signal from said combined signal to generate said error signal; and maximum likelihood sequence estimating means for making a signal decision by maximum likelihood sequence estimation using the square of said error signal as likelihood information, for outputting said decision signal, and for outputting a complex symbol candidate as said feedback complex symbol signal.

6. The adaptive array transmitter-receiver of claim 5, wherein said feedback filter means comprises: multiplier means for convoluting a preceding version of said complex symbol candidate by said feedback filter coefficient; and complex adder for adding together the result of convolution and said complex symbol candidate at the current point in time, and for outputting the result of addition as said feedback signal.

7. The adaptive array transmitter-receiver of claim 5, wherein said feedback filter means comprises: multiplier means for convoluting said complex symbol candidate by said feedback filter coefficient; and a complex adder for adding together the result of convolution and a preceding version of said complex symbol candidate, and for outputting the result of addition as said feedback signal.

8. The adaptive array transmitter-receiver of claim 5, wherein said parameter estimating means is means for estimating said weighting coefficients and said feedback filter coefficient on the basis of said complex symbol candidate input thereto as said complex symbol signal for parameter estimation for each state of the maximum likelihood sequence estimation by said signal decision means, said error signal and said received baseband signals, said weighting coefficients and said feedback filter coefficient in said state corresponding to the maximum likelihood sequence at the last symbol of a received burst signal being set in said transmitted distortion means and said transmitted baseband generating means.

9. The adaptive array transmitter-receiver of claim 5, wherein said parameter estimating means comprises: first delay means supplied with said decision signal as said complex symbol signal for parameter estimation, for delaying said received baseband signal for the time consumed for the signal decision by said signal decision means; second delay means for delaying said error signal for said time of signal decision; and a parameter estimation circuit for estimating said weighting coefficients and said feedback filter coefficient on the basis of said delay error signal, said delayed received baseband signals and said decision signal, said weighting coefficients and said feedback filter coefficient in said state calculated at the final symbol of a received burst signal being set in said transmitted distortion means and said transmitted baseband generating means.

10. The adaptive array transmitter-receiver of claim 1, 2, or 3, wherein said parameter estimating means inputs thereinto, as said complex symbol signal for parameter estimation, a receiver training signal during a training signal period of the received signal, terminates the parameter estimation at the final symbol of said receiver training signal, and sets said weighting coefficients and said feedback filter coefficient at this point in time in said transmitted distortion means and said transmitted baseband generating means.

11. The adaptive array transmitter-receiver of claim 10, wherein said signal decision comprises: a training signal memory with a training signal stored therein; and switching means for outputting, as said feedback complex symbol signal, the training signal read out of said training signal memory during the training signal of the received signal.

12. The adaptive array transmitter-receiver of claim 1, 2, or 3, wherein said linear combination means comprises: a first complex multiplier for multiplying said received baseband signals by said weighting coefficients by multipliers, respectively; and a first complex adder for adding together the results of multiplication into said combined signal; and wherein said transmitted baseband generating means comprises a second complex multiplier for multiplying said transmitted distortion signal by said weighting coefficients, and for outputting the results of multiplication as Q transmitted baseband signals.

13. The adaptive array transmitter-receiver of claim 2, wherein said linear combination means comprises: a first transversal filter for convoluting said received baseband signals by said weighting coefficients as tap coefficients; and first complex adder means for adding together the results of convolution into said combined signal; and wherein said transmitted baseband generating means comprises a second transversal filter for convoluting said transmitted distortion signal by said weighting coefficients as tap coefficients, and for outputting the results of convolution as Q transmitted baseband signals.

14. The adaptive array transmitter-receiver of claim 13, wherein said first and second transversal filters of said linear combination means and said transmitted baseband generating means are each a fractional-interval transversal filter, and said transmitter filter means converts said transmitted distortion signal to a signal of a sampling period which is the delay time of said fractional-interval transversal filter.

15. The adaptive array transmitter-receiver of claim 3, wherein said transmitted distortion means comprises means for controlling an amplification factor in a transmitter training signal duration to make the output of said modulo operation means a pulse waveform.

* * * * *